(12) United States Patent
Green et al.

(10) Patent No.: US 10,046,793 B2
(45) Date of Patent: Aug. 14, 2018

(54) METHODS AND SYSTEMS FOR AUTOMATED DRIVING

(71) Applicant: GM GLOBAL TECHNOLOGY OPERATIONS LLC, Detroit, MI (US)

(72) Inventors: Charles A. Green, Canton, MI (US); Kenneth L. Rosol, Clinton Township, MI (US); Michael P. Turski, Rochester Hills, MI (US); Jeremy A. Salinger, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/191,018

(22) Filed: Feb. 26, 2014

(65) Prior Publication Data

US 2015/0239500 A1    Aug. 27, 2015

(51) Int. Cl.
*B62D 6/00* (2006.01)
*B62D 6/10* (2006.01)
*B62D 15/02* (2006.01)

(52) U.S. Cl.
CPC ............. *B62D 6/10* (2013.01); *B62D 15/025* (2013.01)

(58) Field of Classification Search
USPC .......................................................... 701/41
See application file for complete search history.

(56) References Cited

U.S. PATENT DOCUMENTS

| 5,765,116 A * | 6/1998 | Wilson-Jones | B62D 15/025 180/168 |
| 6,178,365 B1 * | 1/2001 | Kawagoe | B62D 1/286 180/167 |
| 7,706,953 B1 * | 4/2010 | Sun | B60K 31/042 123/399 |
| 2005/0096828 A1 * | 5/2005 | Uemura | B60T 8/17557 701/70 |
| 2005/0228588 A1 * | 10/2005 | Braeuchle | B60W 30/095 701/301 |
| 2007/0198145 A1 * | 8/2007 | Norris | B60T 7/22 701/23 |
| 2009/0312906 A1 * | 12/2009 | Bauer | B60W 40/04 701/36 |
| 2009/0322506 A1 * | 12/2009 | Schmitz | B60K 28/066 340/439 |
| 2010/0222960 A1 * | 9/2010 | Oida | B60G 17/0195 701/31.4 |

(Continued)

FOREIGN PATENT DOCUMENTS

DE    10018873 A1    12/2001

OTHER PUBLICATIONS

State Intellectual Property Office of the People'S Republic of China, Office Action in Chinese Patent Application No. 201510088253.3 dated Oct. 10, 2016.

*Primary Examiner* — Tyler D Paige
(74) *Attorney, Agent, or Firm* — Lorenz & Kopf, LLP

(57) ABSTRACT

Methods and systems for controlling a driving feature for an automated driving system are provided. In one embodiment, a method includes: receiving a first sensor signal from a first sensor; receiving a second sensor signal from a second sensor; selectively determining a driver intent based on at least one of the first sensor signal and the second sensor signal; and controlling the driving feature based on the driver intent.

18 Claims, 4 Drawing Sheets

(56) References Cited

U.S. PATENT DOCUMENTS

| | | | |
|---|---|---|---|
| 2012/0173068 A1* | 7/2012 | Seiter | B60T 7/22 701/23 |
| 2012/0191271 A1* | 7/2012 | Stuebing | B60W 30/12 701/2 |
| 2012/0283912 A1* | 11/2012 | Lee | B62D 1/286 701/41 |
| 2013/0079991 A1* | 3/2013 | Schmidt | B62D 6/00 701/42 |
| 2013/0131907 A1* | 5/2013 | Green | G05D 1/0055 701/23 |
| 2013/0151058 A1* | 6/2013 | Zagorski | B60W 30/09 701/23 |
| 2013/0325202 A1* | 12/2013 | Howard | B60W 30/08 701/1 |
| 2014/0139341 A1* | 5/2014 | Green | B60K 28/06 340/576 |
| 2014/0277896 A1* | 9/2014 | Lathrop | B62D 1/04 701/23 |
| 2014/0309877 A1* | 10/2014 | Ricci | H04W 48/04 701/36 |
| 2014/0379218 A1* | 12/2014 | Foltin | B60Q 1/085 701/41 |
| 2015/0217807 A1* | 8/2015 | Schumacher | B60W 50/10 701/41 |

\* cited by examiner

METHODS AND SYSTEMS FOR AUTOMATED DRIVING

TECHNICAL FIELD

The technical field generally relates to automated driving of a vehicle, and more particularly relates to controlling automated driving of a vehicle based on a plurality of input sensors.

BACKGROUND

Vehicles may be equipped with automated and/or semi-automated driving systems, embodiments, and/or features. Automated and/or semi-automated driving systems may provide automated driving controls of certain driving features that reduce the driver interaction required for operating the driving features. For example, automated cruise control systems may be activated by the driver while the vehicle is in operation and may maintain a selected vehicle speed. In another example, automated lane following systems may be activated by the driver while the vehicle is in motion, and may maintain a position of the vehicle within a lane.

During the automated control by the automated driving system, in some instances, the automated driving systems may leave the driver to control the driving feature when the driver thinks the system is controlling the feature. In this instance, the driving feature is not being controlled by either the driver or the system. In some instances, the automated driving system may take control of the driving feature when the driver is trying to control the feature. In this instance, the control by the automated driving system may frustrate the driver.

Accordingly, it is desirable to provide methods and systems for improving automated driving systems of a vehicle. Furthermore, other desirable features and characteristics of the present invention will become apparent from the subsequent detailed description and the appended claims, taken in conjunction with the accompanying drawings and the foregoing technical field and background.

SUMMARY

In one embodiment, a method of controlling a driving feature for an automated driving system is provided. The method includes: receiving a first sensor signal from a first sensor; receiving a second sensor signal from a second sensor; selectively determining a driver intent based on at least one of the first sensor signal and the second sensor signal; and controlling the driving feature based on the driver intent.

In another embodiment, an automated driving system for controlling a driving feature is provided. The automated driving system includes a first module that receives a first sensor signal from a first sensor, that receives a second sensor signal from a second sensor, and that selectively determines a driver intent based on at least one of the first sensor signal and the second sensor signal. A second module controls the driving feature based on the driver intent.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
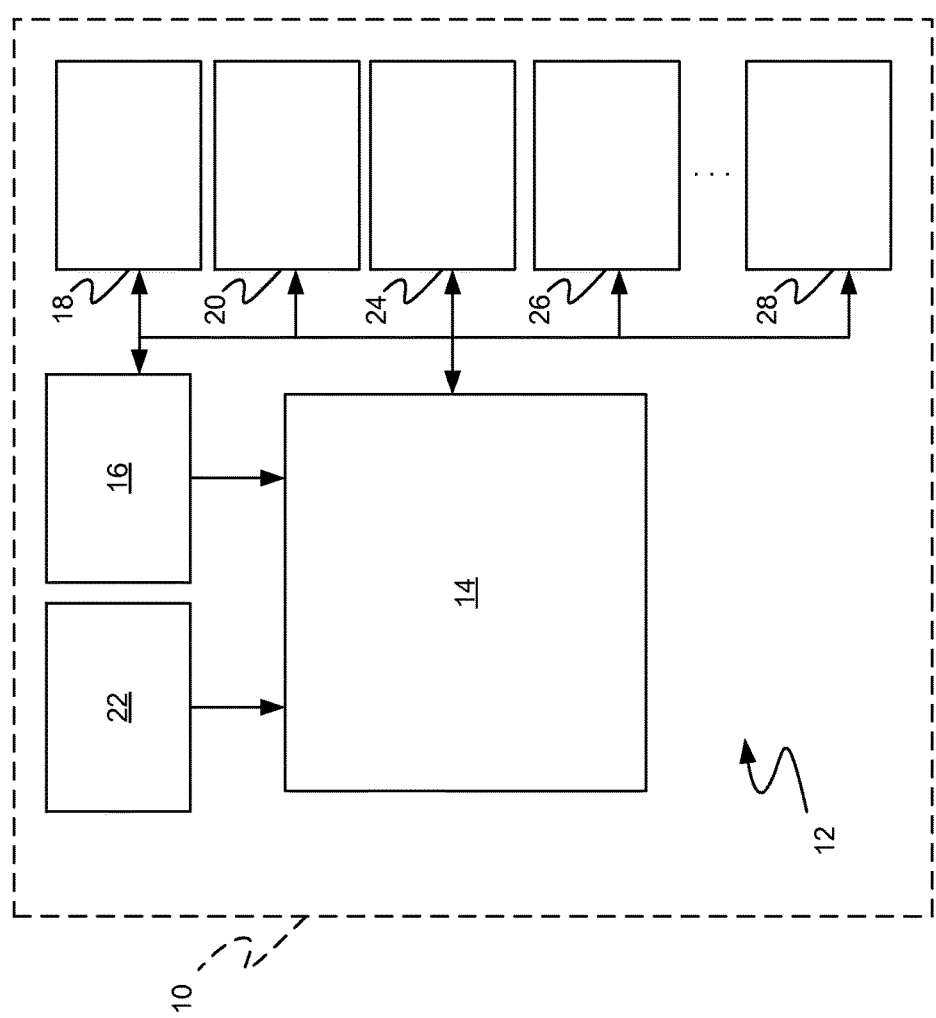
FIG. 1 is a functional block diagram of a vehicle that includes an automated driving system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 is shown to include an automated driving system 12 in accordance with various embodiments. For exemplary purposes, the disclosure will be discussed in the context of the automated driving system 12 being a cruise control system that controls a cruise speed of the vehicle 10 and a steering position of the vehicle 10. As can be appreciated, various embodiments of the present disclosure can include an automated driving system 12 that controls only the cruise speed, that controls only the steering position, or that controls any other automated driving features of the vehicle 10. Although the figures shown herein depict an example with certain arrangements of elements, additional intervening elements, devices, features, or components may be present in an actual embodiments. It should also be understood that FIG. 1 is merely illustrative and may not be drawn to scale.

As shown, the automated driving system 12 includes a control module 14 that is communicatively coupled to one or more sensors 16. The sensors 16 sense observable conditions of various vehicle systems and generate sensor signals based thereon. In various embodiments, at least some of the sensors 16 sense observable conditions of a steering system 18 of the vehicle 10. For example, the sensors 16 include a torque sensor that senses a torque applied to a steering wheel of the steering system 18 (e.g., by a driver turning the steering wheel in a counter clockwise direction or a clockwise direction); and hold sensors that sense a touch applied to a steering wheel (for example, through a change in capacitance) of the steering system 18 according to a certain pattern (e.g., by a driver grasping and holding the steering wheel). In various embodiments, at least some of the sensors 16 include pedal position sensors that sense observable conditions of a brake pedal and/or an accelerator pedal of a pedal system 20 of the vehicle 10. For example, the sensors 16 include a brake pedal position sensor that senses a position of the brake pedal; and an accelerator pedal position sensor that senses a position of the accelerator pedal. In various embodiments, at least some of the sensors 16 include lane position sensors that sense observable conditions of the vehicle 10 with respect to the lane the vehicle 10 is driving in.

The control module 14 is further communicatively coupled to automated driving actuators 22. The actuators 22, when actuated by a driver of the vehicle 10, generate on/off signals indicating whether to turn the control system on or off, accelerate/decelerate signals indicating whether to accelerate or decelerate while the control system is on, and set speed signals indicating when to set the speed of the vehicle 10 to the set speed.

Based on the sensor signals and the actuator signals, the control module 14 generates control signals to one or more systems 24-28 of the vehicle 10 to automate the driving feature of the vehicle 10. For example, the control module 14 generates control signals to an engine system 24 of the vehicle 10 to automate a cruise speed of the vehicle 10 (e.g., such that the speed of the vehicle 10 remains at a set speed). In another example, the control module 14 generates control signals to the steering system 18 to automate a steering position of the vehicle 10 (e.g., such that the position of the vehicle 10 remains at a certain position within the lane).

Figure 2:
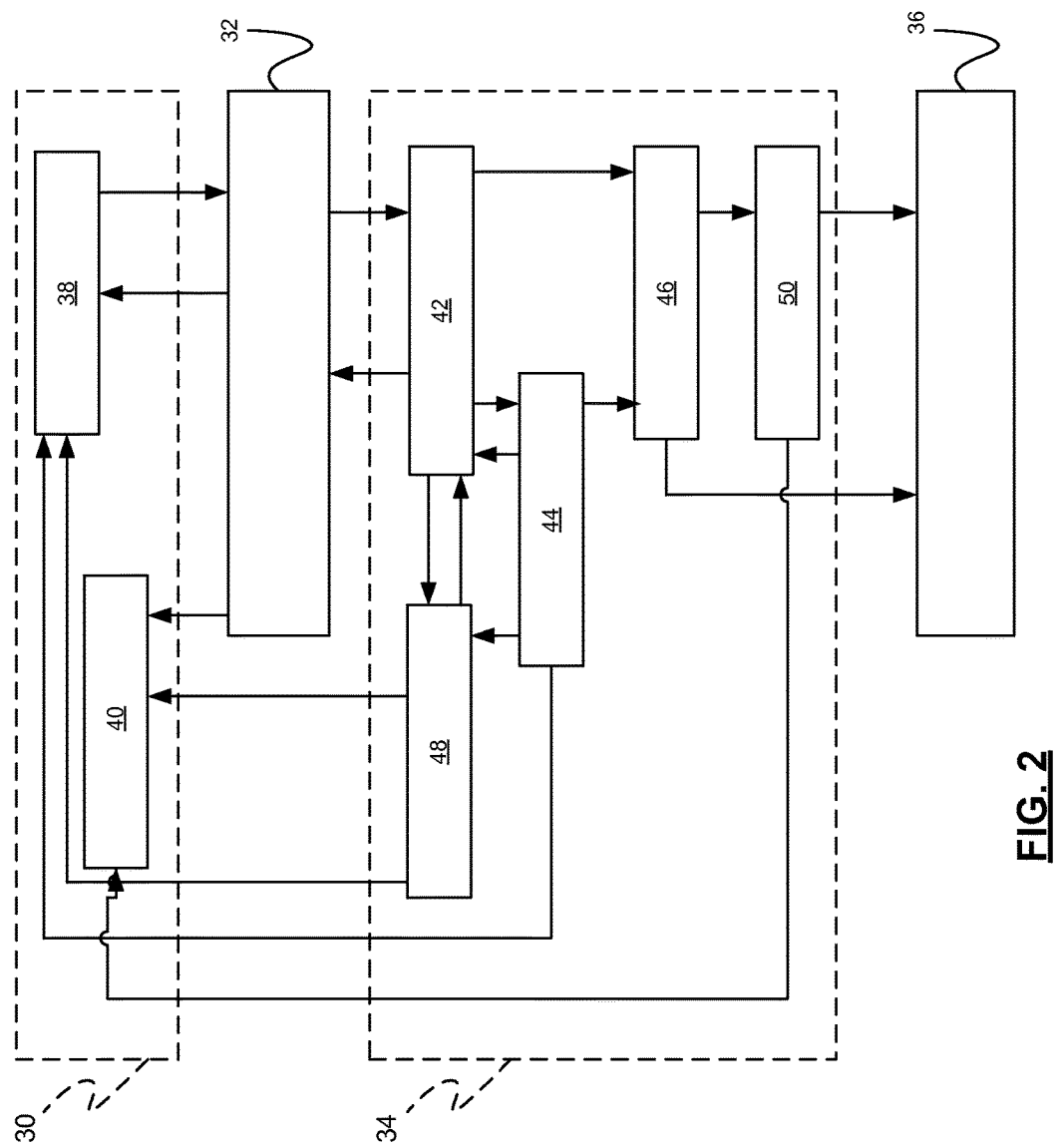
FIG. 2 is a state diagram illustrating operating states, operating sub-states, and transitions of the automated driving system in accordance with various embodiments.

In various embodiments, the control module 14 automates the cruise speed of the vehicle 10 and the steering position of the vehicle 10 based on various operating states. As can be appreciated, in various embodiments, one or more of the operating states may include one or more operating sub-states. As shown in FIG. 2 (and with continued reference to FIG. 1), the operating states can include, but are not limited to, a disabled state 30, an enabled state 32, an engaged state 34, and a driver control state 36. When in the disabled state 30, the automated driving system 12 is disabled (e.g., turned off). When in the enabled state 32, the automated driving system 12 is enabled (e.g., turned on) but not actively controlling the driving feature. When in the engaged state 34, the automated driving system 12 actively controls the driving feature such as the cruise speed and/or the steering position. When in the driver control state 36, the automated driving system 12 is disabled and may not be re-enabled due to determined driver misuse of the system 12.

In various embodiments, the operating sub-states of the disabled state 30 include a no fail state 38, and a fail state 40. When in the fail state 38, the automated driving system 12 is disabled due to a failure. When in the no fail state 40, the automated driving system 12 is disabled without any failure.

In various embodiments, the operating sub-states of the engaged state 34 include an active normal state 42, an active degraded state 44, a degraded no return state 46, an override state 48, and an ending state 50. When in the active normal state 42, the automated driving system 12 is engaged and actively controlling the driving feature, for example, the cruise speed and the steering position. When in the override state 48, the driver temporarily takes control of the driving feature, for example, the steering position and/or the cruise speed and the automated driving system 12 temporarily gives up control of the driving feature, for example, the steering position and/or the cruise speed, with the intent of resuming once the driver has completed the override. When in the active degraded state 44, the automated driving system 12 requests that the driver temporarily take over control of the driving feature, for example the steering position. When in the degraded no return state 46, the automated driving system 12 requests that the driver take over control of the driving feature, for example the steering position, indefinitely. When in the ending state 50, the automated driving system 12 maintains the vehicle in a safe state (for example, stopped) until the driver takes control.

The control module 14 manages the transitions between the operating states and the operating sub-states based on the sensor signals and the actuator signals. In particular, the control module 14 uses the sensor signals to determine an intent of the driver (hereinafter referred to as a driver intent). The control module 14 uses the driver intent along with other criteria (e.g., that is based on the actuator signals and/or the sensor signals) to transition between the operating states and the operating sub-state.

For example, a transition from the engaged state 34 to the disabled state 30 may be based on whether the driver intent indicates that the driver has responded to a request, for example, to hold the steering wheel. In another example, a transition from the active normal state 42 to the override state 48 may be based on whether the driver intent indicates the driver is starting an override procedure. In yet another example, a transition from the override state 48 to the active normal state 42 or the active degraded state 44 may be based on whether the driver intent indicates that the driver has completed the override procedure. In yet another example, a transition from the override state 48 to the active normal state 42 may be based on whether the driver intent indicates that the driver is allowing the automated driving system 12 to control the feature. In yet another example, a transition from the active degraded state 44 or the degraded no return state 46 to the disabled state 30 may be based on whether the driver intent indicates whether the driver is responding to a request from the automated driving system 12 to take control. In another example, a transition from the active degraded state 44 to the override state 48 may be based on whether the driver intent indicates that the driver is responding to a request from the automated driving system 12 to take control.

Basing the transitions on the driver intent prevents the automated driving system 12 from taking control when the driver intends to override the system 12, prevents the automated driving system 12 from allowing the driver to override the system 12 when the driver does not intend to override the system 12 (e.g. the driving feature is not being controlled by either the driver or the automated system 12), or prevents the automated driving system 12 from taking control of the driving feature before the driver has completed the override of the system 12.

In various embodiments, the control module 14 determines the driver intent to be at least one of starting an override procedure, completing an override procedure, responding to a request from the automated driving system 12 to take control, or allowing the automated driving system 12 to control the feature. In various embodiments, the control module 14 determines the driver intent based on at least two sensor signals from at least two sensors. The at least two sensors are associated with at least two different components of the vehicle 10. For example, the control module 14 may determine the driver intent based on a torque sensor signal from the torque sensor and a hold sensor signal from the hold sensors. In another example, the control module 14 may determine the driver intent based on a torque sensor signal from the torque sensor and the brake pedal position signal from the brake pedal position sensor. In still another example, the control module 14 may determine the driver intent based on a hold sensor signal from the hold sensors and the brake pedal position signals from the brake pedal position sensor. As can be appreciated, various embodiments of the present disclosure may use any combination of at least two sensor signals associated with at least two different components and is not limited to the present examples.

Basing the determination of the driver intent on at least two sensor signals allows for a more accurate determination of the driver intent, for example, in the case when one or more of the sensor signals may be inaccurate. For example, the touch sensing input may sense electric fields near the steering wheel, either determining that a hold has occurred when it has not, or determining that no hold has occurred when the driver is holding the steering wheel, due to natural variations in the capacitance of the driver's hands and of the steering wheel. In another example, a torque sensor on the steering wheel may incorrectly sense the driver steering, for example by sensing feedback from a road variation such as a pothole.

Further, depending on the consequences of the specific state transition, it may be more accurate to have the automated driving system 12 require both the touch sensing and the torque sensing to indicate driver intent, for example to determine that an override has been completed. In another example, it may be more accurate for the automated driving system 12 to only rely on one of the touch sensing signals or the torque sensing signals to indicate driver intent, for example when a driver take over is requested. Utilizing more than one sensor or each sensor separately may also depend on how accurate each sensor is in the application.

Figure 3:
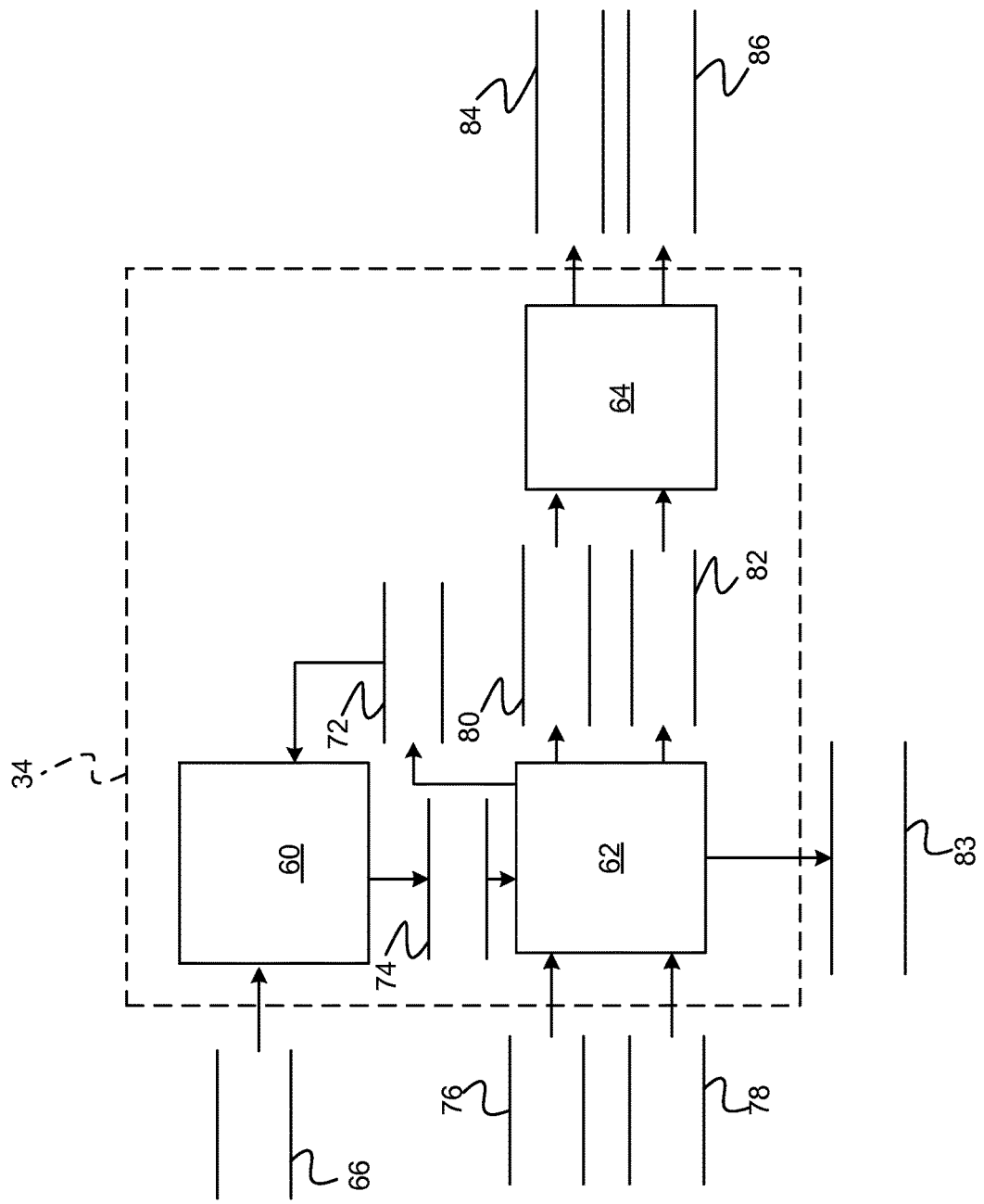
FIG. 3 is dataflow diagram illustrating a control module of the automated driving system in accordance with various embodiments.

Referring now to FIG. 3 and with continued reference to FIGS. 1 and 2, a dataflow diagram illustrates various embodiments of the control module 14 of the automated driving system 12. Various embodiments of the control module 14 according to the present disclosure may include any number of sub-modules. As can be appreciated, the sub-modules shown in FIG. 3 may be combined and/or further partitioned to similarly manage the control of the driving feature or features. Inputs to the control module 14 may be received from the sensors 16 and actuators 22 of the vehicle 10, received from other control modules (not shown) of the vehicle 10, and/or determined by other sub-modules (not shown) of the control module 14. In various embodiments, the control module 14 (FIG. 1) includes a driver intent determination module 60, an operating state determination module 62, and a feature control module 64.

The driver intent determination module 60 receives as input sensor signals 66 and any requests 72 for the driver to take control. Based on the inputs 66-72, the driver intent determination module 60 determines a driver intent 74. For example, the driver intent determination module 60 determines the driver intent 74 to be at least one of a start of a driver override procedure, a completion of a driver override procedure, a driver responding to a request, and allowing the automated driving system 12 to control the feature.

In various embodiments, the sensor signals 66 include the torque sensor signals and the hold sensor signals and the driver intent 74 is determined with regard to the steering system 18. In such embodiments, the driver intent determination module 60 determines the driver intent 74 to be a start of a driver override procedure when the torque sensor signals indicate torque (e.g., above a threshold) applied to the steering system 18 and the hold sensor signals indicate a driver hold on the steering wheel of the steering system 18. In such embodiments, the driver intent determination module 60 determines the driver intent 74 to be a completion of a driver override procedure when the torque sensor signals indicate zero torque (or below a threshold) applied to the steering system 18 or the hold sensor signals indicate a no driver hold (e.g., capacitance less than a threshold) on the steering wheel of the steering system 18.

In such embodiments, the driver intent determination module 60 determines the driver intent 74 to be a driver responding to a particular request, such as when the request 72 indicates to steer the vehicle 10, when the torque sensor signals indicate torque (e.g., above a threshold) applied to the steering system 18, or the hold sensor signals indicate a driver hold on the steering wheel of the steering system 18. In such embodiments, the driver intent determination module 60 determines the driver intent to be a driver responding to a particular request, such as when the request 72 indicates a request to hold the steering wheel, when the torque sensor signals indicate no torque (e.g., less than a threshold) applied to the steering system 18 or the hold sensor signals indicate a driver hold on the steering wheel of the steering system 18. In this case, it is more important to err that the hold has occurred, rather than err that it has not occurred.

In such embodiments, the driver intent determination module 60 determines the driver intent 74 to be allowing the automated driving system 12 to control the feature (e.g., the driver merely resting the hands on the steering wheel), when the torque sensor signals indicate zero torque (or below a threshold) applied to the steering system 18, and the hold sensor signals indicate a no driver hold (e.g., pressure less than a threshold) on the steering wheel of the steering system 18 or the hold sensor signals indicate a driver hold (e.g., pressure above a threshold) on the steering wheel of the steering system 18 (e.g., a driver just resting the hands on the steering wheel). As can be appreciated, at least two sensor signals can be used in other scenarios to determine driver intent 74 in other embodiments. Thus, the disclosure is not limited to the present examples.

The operating state determination module 62 receives as input the driver intent 74, actuator signals 76 (e.g., from the actuators 22), and the sensor signals 78 (e.g., from the sensor 16). Using the inputs 74-78, the operating state determination module 62 determines a current operating state 80 and, in some cases, a current operating sub-state 82. For example, the operating state determination module 62 determines the current operating state 80 to be at least one of the disabled state 30, the enabled state 32, the engaged state 34, and the driver control state 36 based on the transition criteria described with regard to FIG. 2. When the operating state 80 is determined to be the disabled state 30, the operating state determination module 62 determines the current operating sub-state 82 to be at least one of the fail state 40 and the no fail state 38 based on the transition criteria described with regard to FIG. 2. When the operating state 80 is determined to be the engaged state 34, the operating state determination module 62 determines the current operating sub-state 82 to be at least one of the active normal state 42, the active degraded state 44, the steering override state 48, the degraded no return state 46, and the ending state 50 based on the transition criteria described with regard to FIG. 2. If a transition to a particular operating state requires a request for the driver to act, the request 72 is generated and notification data 83 is generated to active a notification device (not shown) to do notify the driver of the request 72.

The driving feature control module 64 receives as input the operating state 80 and/or the operating sub-state 82. Based on the inputs 80-82, the driving feature control module 64 generates controls signals 84 to control the driving feature or features. In various embodiments, the driving feature control module 64 generates control signals 84 to control a cruise speed of the vehicle 10 or to stop automated control of the cruise speed of the vehicle 10. For example, when the operating state 80 is the disabled state 30, the enabled state 32, or the driver control state 36, the driving feature control module 64 generates control signals 84 (or ceases to generate control signals 84) to stop automated control of the cruise speed. In another example, when the operating state 80 is the engaged state 34, the operating sub-state 82 is evaluated to determine what control signals 84 to generate.

In various embodiments, the driving feature control module 64 generates control signals 84 to control a steering position of the vehicle 10 or to stop automated control of the steering position of the vehicle 10. For example, when the operating state 80 is the disabled state 30, the enabled state 32, or the driver control state 36, the driving feature control module 64 generates control signals 84 (or ceases to generate control signals 84) to stop automated control of the steering position. In another example, when the operating state 80 is the engaged state 34, the operating sub-state 82 is evaluated to determine what control signals 84 to generate.

Further based on the inputs, the driving feature control module 64 selectively generates fault notification data 86 that may be used to notify the driver of a possible fault in the system 12 and/or a fault in operating the system 12. For example, when the operating state 80 is the driver control state 36, the fault notification data 86 can be generated to notify the driver of the misuse of the system.

Figure 4:
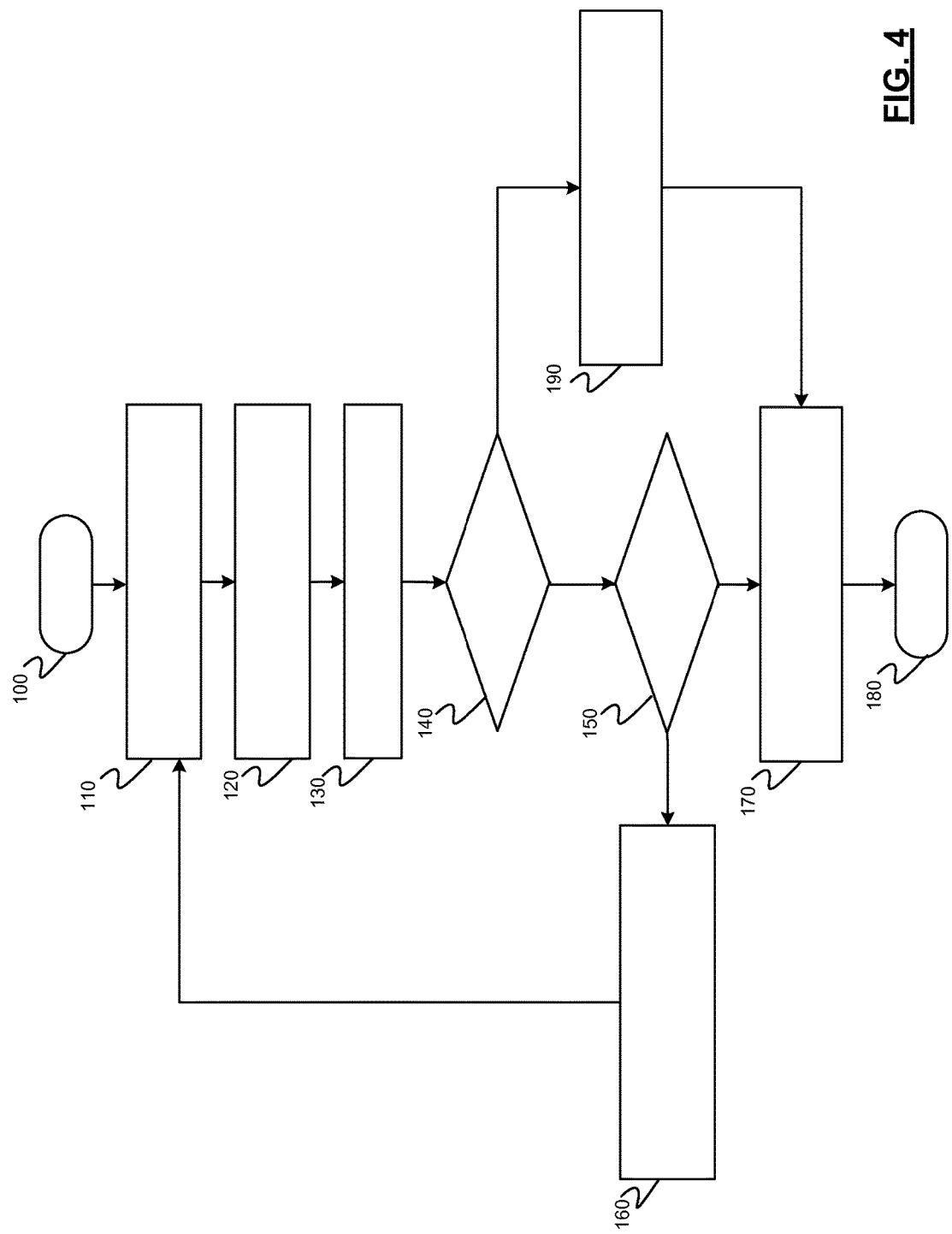
FIG. 4 is a flowchart illustrating a control method of the automated driving system in accordance with various embodiments.

Referring now to FIG. 4, and with continued reference to FIGS. 1 to 3, a flowchart illustrates an automated driving control method that can be performed by the automated driving system 12 of FIGS. 1 to 3 in accordance with various embodiments. As can be appreciated in light of the disclosure, the order of operation within the method is not limited to the sequential execution as illustrated in FIG. 4, but may be performed in one or more varying orders as applicable and in accordance with the present disclosure.

As can further be appreciated, the method of FIG. 4 may be scheduled to run at predetermined time intervals during operation of the vehicle 10 and/or may be scheduled to run based on predetermined events.

In one example, the method may begin at 100. The sensor signals 66 from the at least two sensors are received at 110. The driver intent 74 is determined based on the sensor signals 66 at 120, for example as discussed above with regard to FIGS. 2 and 3. The operating state 80 and/or the operating sub-state 82 is selectively determined based on the driver intent 74 and/or other criteria at 130, for example as discussed above with regard to FIGS. 2 and 3. If the determination of the operating state 80 and/or the operating sub-state 82 requires a driver notification to be generated at 140, and the notification data is based on a request 72 (e.g., to place hands on the steering wheel and hold the steering wheel, or other request) at 150, the driver notification data 86 is generated at 160. The method continues with receiving sensor signals 66 at 110 and determining the driver intent 74, the operating state 80 and/or the operating sub-state 82 at 120 and 130 respectively.

If, at 140, the determination of the operating state 80 and/or the operating sub-state 82 requires a driver notification, and the driver notification is for an unrecoverable fault at 150, the driver notification data 86 indicating the fault is generated at 170. Thereafter, the method may end at 180.

If, at 140, the determination of the operating state 80 and/or the operating sub-state 82 does not require a driver notification, the control signals 84 are generated to the driving feature based on the operating state 80 and/or the operating sub-state 82 at 190. Thereafter the method may end at 180.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a driving feature for an automated driving system, comprising:
    receiving a first sensor signal from a first sensor that senses observable conditions, wherein the first sensor is one of a torque sensor associated with a steering wheel, and a hold sensor associated with the steering wheel;
    receiving a second sensor signal from a second sensor that senses observable conditions, wherein the second sensor is one of a brake pedal position sensor, and an acceleration pedal position sensor;
    selectively determining a driver intent to be one of starting an override procedure, completing an override procedure, responding to a request from the automated driving system to take control, and allowing the automated driving system to control the feature by evaluating both the first sensor signal and the second sensor signal based on a state machine stored in a non-transitory computer readable medium, wherein the state machine includes a disabled state, an enabled state, an engaged state, and a driver control state, wherein the engaged state includes an active normal sub-state, an active degraded sub-state, a degraded no return sub-state, an override sub-state, an ending sub-state, and rules for transitioning between each of the states and sub-states; and
    controlling the driving feature based on the driver intent.

2. The method of claim 1 further comprising:
    determining at least one of an operating state and an operating sub-state based on the driver intent; and
    wherein the controlling the driving feature is based on the at least one of the operating state and the operating sub-state.

3. The method of claim 2 further comprising:
    generating driver notification data based on the at least one of the operating state and the operating sub-state.

4. The method of claim 1 wherein the receiving the first sensor signal is from a torque sensor associated with a steering system.

5. The method of claim 1 wherein the receiving the first sensor signal is from steering wheel hold sensors associated with the steering system.

6. The method of claim 1 wherein the determining the driver intent comprises determining the driver intent to be starting an override procedure.

7. The method of claim 1 wherein the determining the drive intent comprises determining the driver intent to be completing an override procedure.

8. The method of claim 1 wherein the determining the driver intent comprises determining the driver intent to be responding to a request of the automated driving system.

9. The method of claim 1 wherein the determining the driver intent comprises determining the driver intent to be allowing the automated driving system to control the feature.

10. An automated driving system for controlling a driving feature, comprising:
a first module that receives a first sensor signal from a first sensor that senses observable conditions, that receives a second sensor signal from a second sensor that senses observable conditions, wherein the first sensor is one of a torque sensor associated with a steering wheel, and a hold sensor associated with the steering wheel, wherein the second sensor is one of a brake pedal position sensor, and an acceleration pedal position sensor, and that selectively determines a driver intent to be one of starting an override procedure, completing an override procedure, responding to a request from the automated driving system to take control, and allowing the automated driving system to control the feature by evaluating both the first sensor signal and the second sensor signal based on a state machine stored in a non-transitory computer readable medium, wherein the state machine includes a disabled state, an enabled state, an engaged state, and a driver control state, wherein the engaged state includes an active normal sub-state, an active degraded sub-state, a degraded no return sub-state, an override sub-state, an ending sub-state, and rules for transitioning between each of the states and sub-states; and
a second module that controls the driving feature based on the driver intent.

11. The automated driving system of claim 10 further comprising:
a third module that determines at least one of an operating state and an operating sub-state based on the driver intent; and
wherein the second module controls the driving feature based on the at least one of the operating state and the operating sub-state.

12. The automated driving system of claim 11 wherein the third module generates driver notification data based on the at least one of the operating state and the operating sub-state.

13. The automated driving system of claim 10 wherein the first module receives the first sensor signal from a torque sensor associated with a steering system.

14. The automated driving system of claim 10 wherein the first module receives the first sensor signal from steering wheel hold sensors associated with the steering system.

15. The automated driving system of claim 10 wherein the first module determines the driver intent to be starting an override procedure.

16. The automated driving system of claim 10 wherein the first module determines the driver intent to be completing an override procedure.

17. The automated driving system of claim 10 wherein the first module determines the driver intent to be responding to a request of the automated driving system.

18. The automated driving system of claim 10 wherein the first module determines the driver intent to be allowing the automated driving system to control the feature.

* * * * *